US010506106B2

(12) United States Patent
Chandrashekar et al.

(10) Patent No.: US 10,506,106 B2
(45) Date of Patent: *Dec. 10, 2019

(54) SUPPORT SYSTEM FOR CELLULAR BASED RESOURCE SHARING SERVICE

(71) Applicant: International Business Machines Corporation, Armonk, NY (US)

(72) Inventors: Shiva P. Chandrashekar, Bangalore (IN); Ashoka S. Rao, Bangalore (IN); Sreekrishnan Venkateswaran, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/053,858

(22) Filed: Aug. 3, 2018

(65) Prior Publication Data

US 2019/0014218 A1   Jan. 10, 2019

Related U.S. Application Data (63) Continuation of application No. 15/641,619, filed on Jul. 5, 2017, now Pat. No. 10,142,491.

(51) Int. Cl.
*H04M 15/00* (2006.01)
*G06Q 30/02* (2012.01)
(Continued)

(52) U.S. Cl.
CPC ............ *H04M 15/60* (2013.01); *G06Q 20/14* (2013.01); *G06Q 20/145* (2013.01);
(Continued)

(58) Field of Classification Search
CPC ................. H04M 15/00; H04M 17/00; H04M 2215/2026; H04M 2215/32; H04W 4/24;
(Continued)

(56) References Cited

U.S. PATENT DOCUMENTS 8,233,408 B2   7/2012  Lu et al.
8,452,957 B2   5/2013  Pourzandi et al.
(Continued)

FOREIGN PATENT DOCUMENTS

CN    102972088 A    3/2013
EP      2728962 A1   7/2014
(Continued)

OTHER PUBLICATIONS

Non-Final Office Action dated Feb. 23, 2018 for U.S. Appl. No. 15/641,619, filed Jul. 5, 2017; pp. 23.
(Continued)

*Primary Examiner* — Sharad Rampuria
(74) *Attorney, Agent, or Firm* — Robert J. Shatto; Hoffman Warnick LLC (57) ABSTRACT

A system, method and program product for implementing a cellular resource sharing support system. A system is disclosed that includes: a behavior analysis system that collects usage data from a set of mobile devices in a cellular network; a subscription manager that computationally generates offers to mobile device owners to avail excess compute resources of the mobile devices to a resource sharing services system; a device manager that tracks the real-time availability and usage of participating mobile devices that are associated with mobile device owners that have accepted offers to avail excess compute resources; and an account manager that calculates a compensation for participating mobile devices.

20 Claims, 6 Drawing Sheets

(51) Int. Cl.
*G06Q 20/14* (2012.01)
*H04L 12/14* (2006.01)
*H04W 4/24* (2018.01)
*G06Q 20/32* (2012.01)
*G06Q 20/38* (2012.01)
*G06Q 20/40* (2012.01)

(52) U.S. Cl.
CPC ..... *G06Q 20/322* (2013.01); *G06Q 20/38215* (2013.01); *G06Q 20/40145* (2013.01); *G06Q 30/0207* (2013.01); *H04L 12/14* (2013.01); *H04L 12/1403* (2013.01); *H04M 15/58* (2013.01); *H04M 15/8083* (2013.01); *H04W 4/24* (2013.01); *G06Q 2220/00* (2013.01); *H04M 2215/0184* (2013.01); *H04M 2215/0188* (2013.01)

(58) Field of Classification Search
CPC ..... G06Q 10/06313; G06Q 10/063118; G06Q 10/103; G05B 19/418; G05B 19/41865; G05B 19/41885; G06F 16/327
See application file for complete search history.

(56) References Cited

U.S. PATENT DOCUMENTS

| | | | |
|---|---|---|---|
| 8,612,276 B1 | 12/2013 | Nielsen et al. | |
| 8,654,683 B2 | 2/2014 | Lu et al. | |
| 8,666,437 B2 | 3/2014 | Stromberg et al. | |
| 8,811,363 B2 | 8/2014 | Velasco | |
| 8,931,038 B2 | 1/2015 | Pulier et al. | |
| 9,978,078 B2 * | 5/2018 | Georgoff | G06Q 30/0246 |
| 2007/0087756 A1 | 4/2007 | Hoffberg | |
| 2010/0135200 A1 | 6/2010 | Karaoguz et al. | |
| 2012/0254280 A1 | 10/2012 | Parker, II | |
| 2012/0330711 A1 | 12/2012 | Jain et al. | |
| 2014/0133446 A1 | 5/2014 | Liu et al. | |
| 2014/0273924 A1 * | 9/2014 | Hyde | H04L 12/1403 455/405 |
| 2015/0088607 A1 * | 3/2015 | Georgoff | G06Q 30/0246 705/7.31 |
| 2015/0229713 A1 | 8/2015 | Lu et al. | |
| 2015/0327042 A1 * | 11/2015 | Kempf | G06F 9/5072 455/406 |
| 2016/0004522 A1 | 1/2016 | Connelly et al. | |
| 2016/0182324 A1 | 6/2016 | Harishankar et al. | |

FOREIGN PATENT DOCUMENTS

| | | |
|---|---|---|
| WO | 2013122597 A1 | 8/2013 |
| WO | 2013154596 A1 | 10/2013 |
| WO | 2014145877 A2 | 9/2014 |

OTHER PUBLICATIONS

Notice of Allowance and Fee(s) Due dated Jul. 18, 2018 for U.S. Appl. No. 15/641,619, filed Jul. 5, 2017; pp. 17.

* cited by examiner

SUPPORT SYSTEM FOR CELLULAR BASED RESOURCE SHARING SERVICE

TECHNICAL FIELD

The subject matter of this invention relates to a support system for a cellular based resource sharing service, and more particularly to a platform for managing participation in a cellular based cloud service.

BACKGROUND

Given the flexibility of cloud based computing models, the demand for all types of cloud computing services continues to increase. For instance, cloud based services are now commonly used to implement IaaS (Infrastructure as a Service), PaaS (Platform as a Service), SaaS (Software as a Service), etc., models for cloud resource consumers.

As computational needs become even more prolific for cutting edge technologies, e.g., for devices employing Internet of Things (IoT) technologies, artificial intelligence (AI) technologies, autonomous capabilities, thin client systems, etc., flexible platforms for delivering cloud based resources will be required. For instance, the computational needs for some resource consumers may require "lightweight" on-demand resources, meaning that the computational requirements may be relatively small and/or of a short duration, but needed quickly. Cloud platforms capable of delivering lightweight services will likely become more important, and flexible systems for delivering such services will be required.

SUMMARY

Aspects of the disclosure provide a service platform for managing participation in and operations of a cellular based cloud service. In this approach, the service platform obtains excess compute resources from mobile devices in a cellular network, and then packages and resells such resources via a cloud-based model.

In one embodiment, the platform includes a business support system (BSS) to monetize unused mobile information technology (IT) resources. By leveraging the platform, a telecom provider can enter the cloud business without investing in a data center. Instead, a "virtual data center" infrastructure is created out of underutilized smart devices in the cellular network. This virtual mobile data center can be leveraged by telecom providers to create a consumable retail service that can, e.g., seed a cloud business unit. The result is an inexpensive 'virtualization' of mobile IT, transforming the resources into lightweight virtual machine (VM) units, e.g., sold by a cloud computing business line.

A first aspect discloses a cellular resource sharing support system, including: a behavior analysis system that collects usage data from a set of mobile devices in a cellular network; a subscription manager that computationally generates offers to mobile device owners to avail excess compute resources of the mobile devices to a resource sharing services system; a device manager that tracks the real-time availability and usage of participating mobile devices that are associated with mobile device owners that have accepted offers to avail excess compute resources; and an account manager that calculates a compensation for participating mobile devices.

A second aspect discloses a computer program product stored on a computer readable storage medium, which when executed by a computing system, provides a cellular resource sharing support system, the program product including: program code that collects usage data from a set of mobile devices in a cellular network; program code that computationally generates offers to mobile device owners to avail excess compute resources of the mobile devices to a resource sharing services system; program code that tracks the real-time availability and usage of participating mobile devices that are associated with mobile device owners that have accepted offers to avail excess compute resources; and program code that calculates a compensation for participating mobile devices.

A third aspect discloses a computerized method that provides a cellular resource sharing support system, the method comprising: collecting usage data from a set of mobile devices in a cellular network; computationally generating offers to mobile device owners to avail excess compute resources of the mobile devices to a resource sharing services system; tracking the real-time availability and usage of participating mobile devices that are associated with mobile device owners that have accepted offers to avail excess compute resources; and calculating a compensation for participating mobile devices.

A fourth aspect discloses a BSS (business support system) mobile agent adapted to run on a mobile device in a cellular network, including: a system for exchanging data with a master BSS manager; a monitoring system that monitors actions associated with the mobile device including usage data and cognitive behavior data; and a subscription interface for allowing a user to manage offers associated with excess compute resources.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Described herein is a platform for implementing and managing a cellular based cloud (i.e., resource sharing) service. The platform obtains excess compute resources (e.g., CPU cycles, memory, services, etc.) from mobile devices in a cellular network and then packages and sells the resources via a cloud-based model. In one embodiment, the platform provides a business support system (BSS) to monetize unused mobile information technology (IT) resources.

In the telecommunications industry, a BSS refers to the components a telecommunications services provider (also referred to as a telecom or a provider) uses to run its customer business operations. In this case, the described platform may be implemented by such a provider or by a third party.

Figure 1:
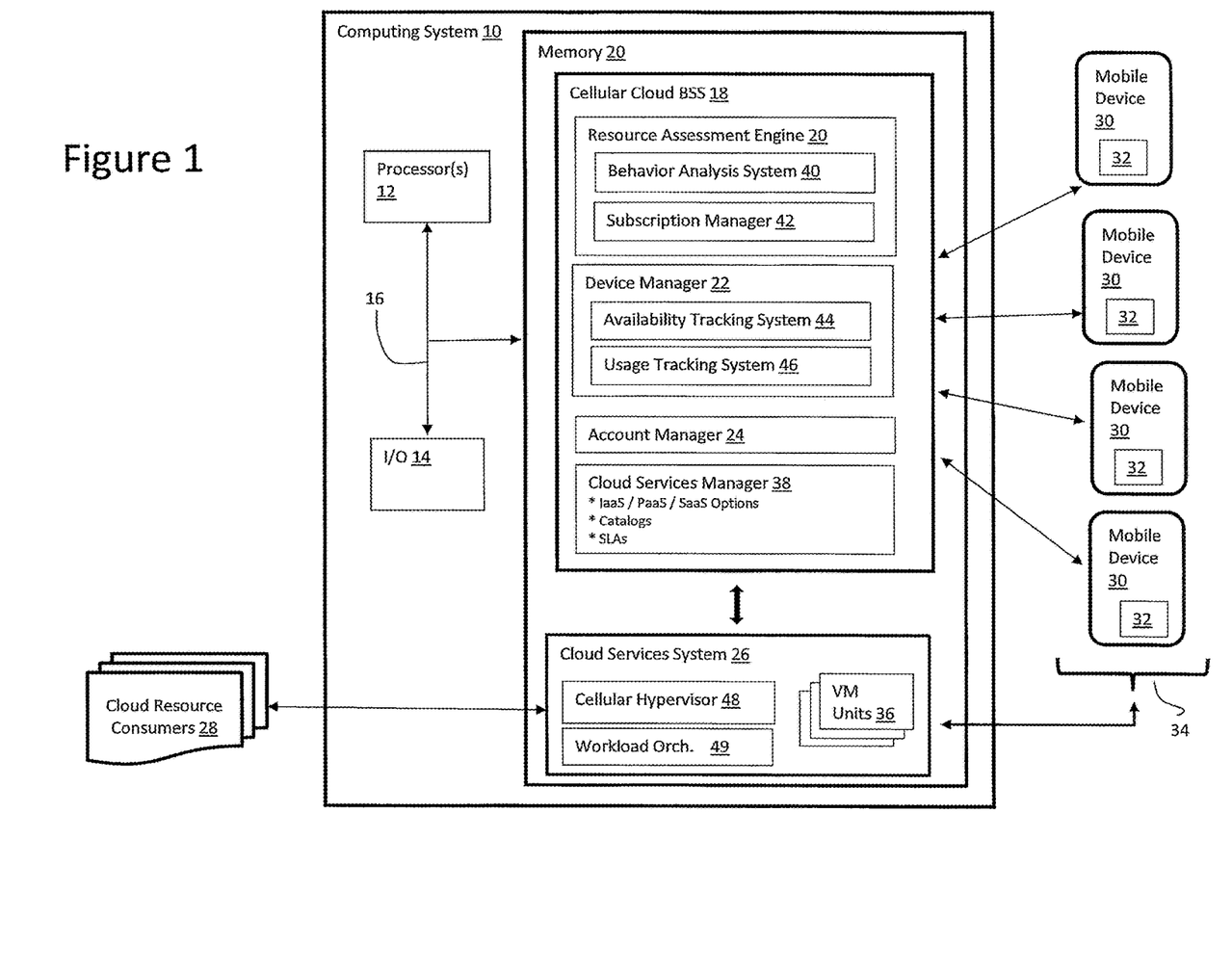
FIG. 1 shows a cellular cloud business support system according to embodiments.

Referring now to the drawings, FIG. 1 depicts a computing system 10 having a cellular cloud BSS 18 capable of interacting with a set mobile devices (i.e., "devices") 30 in a cellular network 34. Each device 30 has the option of participating with the cellular cloud BSS 18 to allow excess compute resources of the device 30 to be made available to a cloud services system 26 for repacking and consumption by cloud resource consumers 28. In this illustrative embodiment, cloud services system 26 is managed by a cloud services manager 38, which may implement various services offerings (e.g., IaaS, PaaS, SaaS, etc.), provide cataloged applications, and implement SLAs (service level agreements) with cloud resource consumers 28. Service offerings may for example be implemented and packaged as lightweight virtual machine (VM) units 36 by a cellular hypervisor 48 and workload orchestrator 49. Although shown separately from cellular cloud BSS 18, the cloud services system 26 may be wholly or partially integrated with the cellular cloud BSS 18.

Mobile devices 30 (and/or their associated owners) that participate in availing excess compute resources to the cloud services system 26 receive some form of compensation, such as a billing credit. For the purposes of this disclosure, the term "mobile device owner" may refer to a cellular customer, a computer agent, another device, or any other type of entity capable of controlling a mobile device 30. Cellular cloud BSS 18 provides the infrastructure for overseeing the process, and generally includes: a resource assessment engine 20 that characterizes excess compute resources available from each device 30 and provides contractual offerings to mobile device owners; a device manager 22 that tracks real-time availability and usage of excess compute resources; and an account manager 24 that determines how much compensation a given mobile device 30 is entitled to.

Resource assessment engine 20 may include a behavior analysis system 40 that interacts with mobile agents (i.e., "agents") 32 loaded onto mobile devices 30. Each agent 32 may include a monitoring algorithm that tracks device usage over time, such as CPU utilization, memory availability, etc. Based on the device usage, behavior analysis system 40 determines excess compute resource characteristics for each device 30. For example, it may be determined that a given device 30 is not typically used during night time hours (11 PM to 6 AM), is used heavily in the work hours (6 AM to 5 PM) and is used moderately during the evening hours (5 PM to 11 PM).

Based on determined characteristics of a mobile device 30, a subscription offering is computationally generated by the subscription manager 42, e.g., based on a set of rules. For instance, in the above case, the rules may dictate that an offering should be generated to capture compute resource during the night time hours. Once generated, the offer is communicated to the device owner for the owner to consider. If the owner accepts the offering, a terms and conditions agreement is entered into for the excess compute resources of the owner's device 30 to be availed to the cloud services system 26.

Each particular arrangement with a device owner can vary, and the owner may be given multiple offer options based on the rules and behavior characteristics. For example, if customer device utilization is less than X % on average for Y hours, the customer may commit to make available A % of the utilization for the next J hours. Alternatively, the owner may commit to off-load B % of the compute power daily during definite periods of time (e.g., every night between 10:00 PM to 6:00 AM or during the day between 10:00 AM to 8:00 PM, etc.).

In one embodiment, the service provider might execute a billing credit agreement with participating device owners via an auto-compute commercial model wherein a device owner agrees to off-load a predetermined CPU utilization percentage of his or her mobile device 30 for a predetermined amount of time in exchange for a predetermined billing credit, if the average device CPU utilization of the mobile device has been below a predetermined device CPU utilization for a predetermined amount of time. For example, if the CPU utilization of the owner's device 30 has been below 30% on average for two hours, then 40% of the compute power of the device 30 will be made available for off-load. In the event the owner begins using the device 30 more intensely such that more than a 30% utilization average is detected, the off-load process will terminate.

In another embodiment, the service provider might execute a billing credit agreement with participating device owners, where the owner agrees to avail compute power to the provider as long as the provider guarantees that the off-load shall not diminish CPU under-utilization of the mobile device 30 beyond a predetermined percentage threshold. The amount and timing of any off-load may be determined based on the behavior analysis system 40.

Once a mobile device 30 is contracted to avail excess compute resources, device manager 22 manages the real-time availability and usage of devices for the cloud services system 26. For example, availability tracking system 44 may determine which of the mobile devices 30 are actually available at the present time, e.g., turned on, located within a cellular zone, etc. Usage tracking system 46 may track the actual utilization of each device 30 for the cloud services system 26. Utilization may include overall compute resources being used, excess compute resources available, excess compute resources being used, etc. Regardless, once the availability and/or usage information is collected, account manager 24 calculates the compensation for the device owner in accordance with the agreed to offer. Compensation may for example comprise a billing credit, tokens, access to additional services and applications, etc.

In one embodiment, devices 30 may receive compensation (i.e., usage credit) anytime the device 30 is available during a contracted period. In other cases, a device 30 may only receive usage credit if excess compute resources of the device are actually utilized by the cloud services system 26. In still further cases, a hybrid approach may be implemented where a device receives some credit simply for being available and additional credit for actual usage. In still other cases, compensation may be adjusted based on demand, e.g., during high demand times, higher compensation is given.

Figure 2:
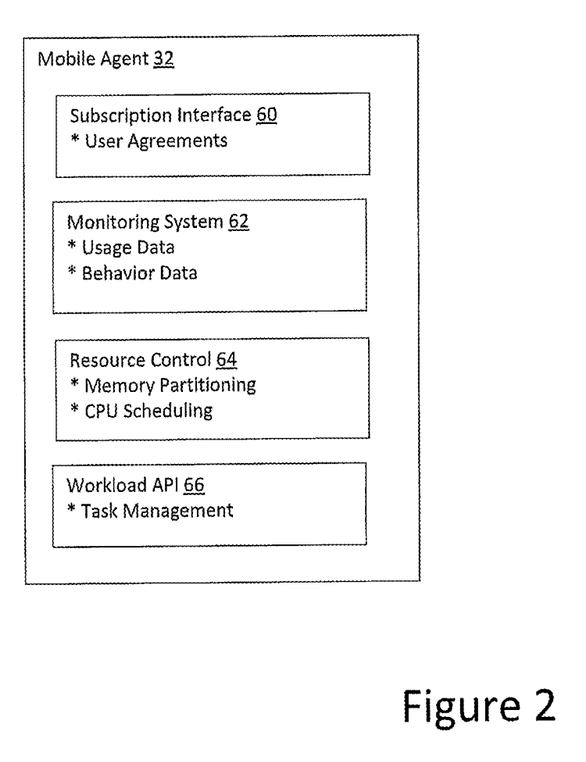
FIG. 2 shows a mobile device agent according to embodiments.

FIG. 2 depicts a block diagram of a mobile agent 32 that can be downloaded and installed on mobile devices 30 (FIG. 1). In this embodiment, mobile agent 32 includes a subscription interface 60 that allows the mobile device 30 and/or owner to participate with offerings from the cellular cloud BSS 18 (FIG. 1). The subscription interface 60 may for example propose subscription offers for the owner, who can then select an option and agree to participate or decline to participate.

Monitoring system 62 is utilized to collect usage and behavior data and the like from the device 30, e.g., raw data about how and when the device 30 is used. The usage data can then be transmitted to the behavior analysis system 40 (FIG. 1) where usage characteristics of the device 30 can be determined. Alternatively, behavior analysis could be computed by the mobile agent 32 and reported back to cellular cloud BSS 18, i.e., as enriched data versus raw data.

Resource control 64 is utilized to allocate excess compute resources of the device 30 to the cloud services system 26. For example, a certain amount of the memory in the device 30 may be partitioned, or CPU scheduling may be set up for cloud use. Once excess compute resources have been allocated for cloud use, workload API 66 provides the communication channel through which the resources on the device 30 are actually engaged for cloud resource consumers 28.

Figure 3:
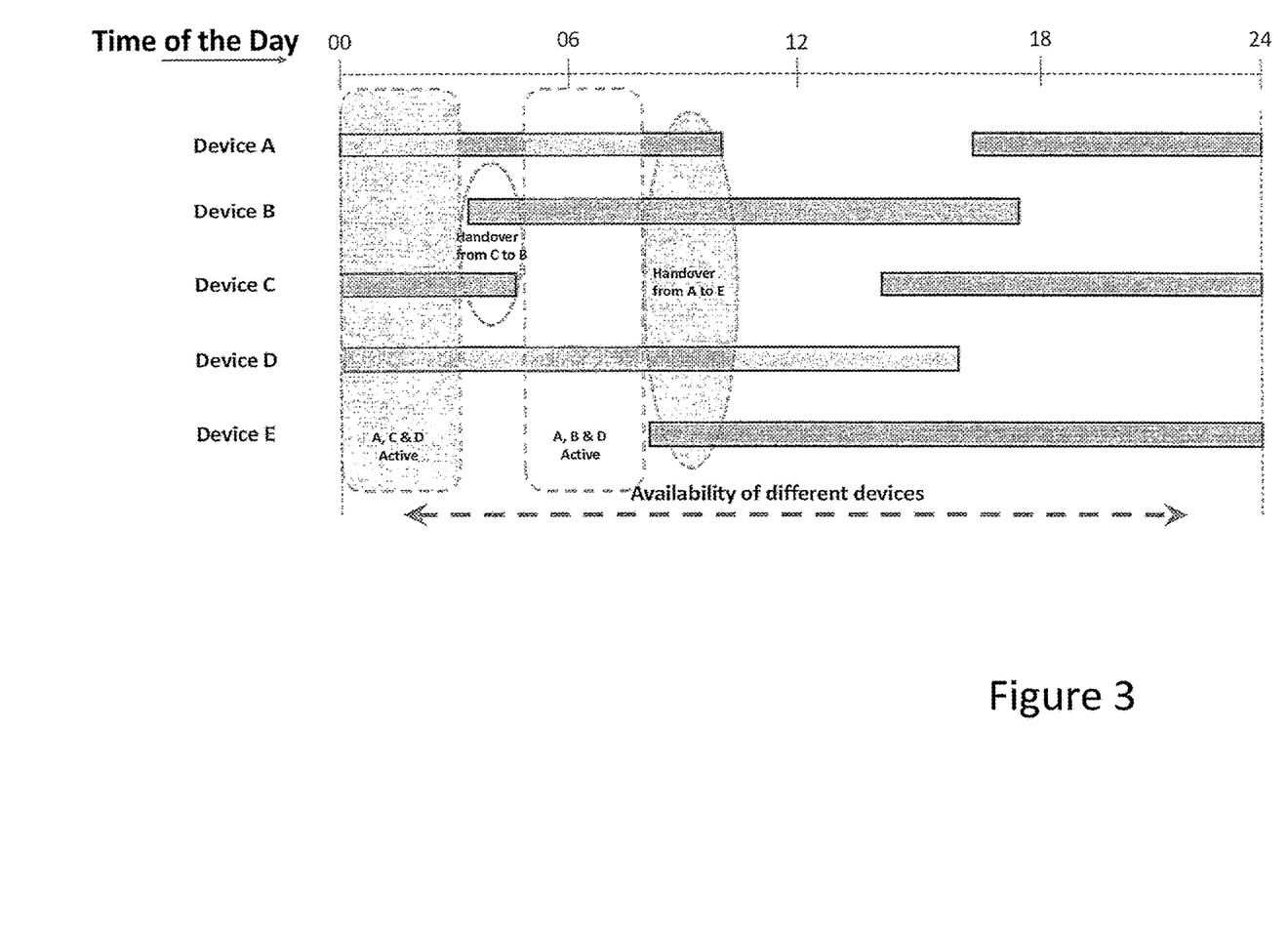
FIG. 3 shows a mobile compute resource scheduling example according to embodiments.

As noted, device manager 22 of FIG. 1 tracks the real-time availability and usage of excess compute resources. In addition, the device manager 22 also identifies and schedules groups of participating mobile devices capable of provisioning a virtual machine unit 36. FIG. 3 depicts a diagram showing how a set of five devices (A,B,C,D,E) may be implemented and scheduled for cloud use by the device manager 32. Generally, a group of three devices must be available at any given point of time to provision a single VM unit, e.g., for redundancy purposes. However, given the fluid nature of mobile devices 30 within a cellular network 34, workloads must be regularly migrated among devices. During migration, e.g., from device C to B, at least two other devices within a group must be up and running. Accordingly, device manager 32 tracks, manages and schedules groups of participating devices 30 to provision VM units 36. When a given device becomes unavailable, e.g., due to migrations, hand-offs, dead devices, etc., device manager 22 ensures seamless availability of the associated VM unit 36.

Figure 4:
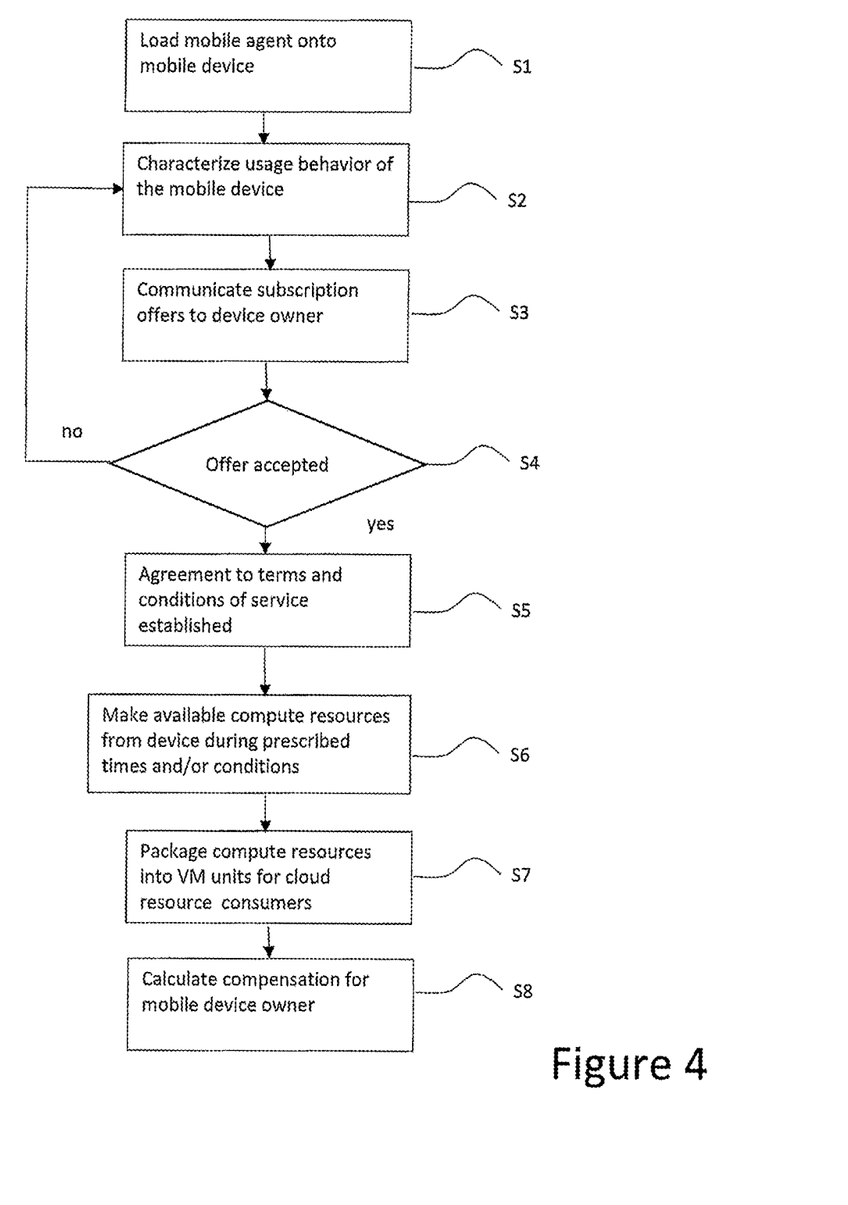
FIG. 4 depicts a flow diagram for implementing a cellular cloud business support system according to embodiments.

FIG. 4 depicts a flow diagram of a method of implementing cellular cloud BSS 18 of FIG. 1. At S1, a mobile agent 32 is loaded on a mobile device 30 and at S2, usage behaviors of the mobile device are collected. Based on usage characteristics, one or more subscription offers are formulated and communicated to the device owner at S3. At S4, a determination is made whether an offer has been accepted. If no, the process loops back to S2, where usage behaviors are again collected to formulate offers at a later time. If yes at S4, agreement to terms and conditions of services are established, e.g., via click box at S5. Once established, excess compute resources from the mobile device 30 are made available during prescribed times and/or conditions at S6. At S7, cloud services system 26 packages the excess compute resources into VM units 36 for cloud resource consumers 28. Finally, at S8, compensation for the mobile device owner is calculated and proffered by the account manager 24.

It is understood that although this disclosure includes a detailed description that may be utilized to provide cloud-based computing services, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

Figure 5:
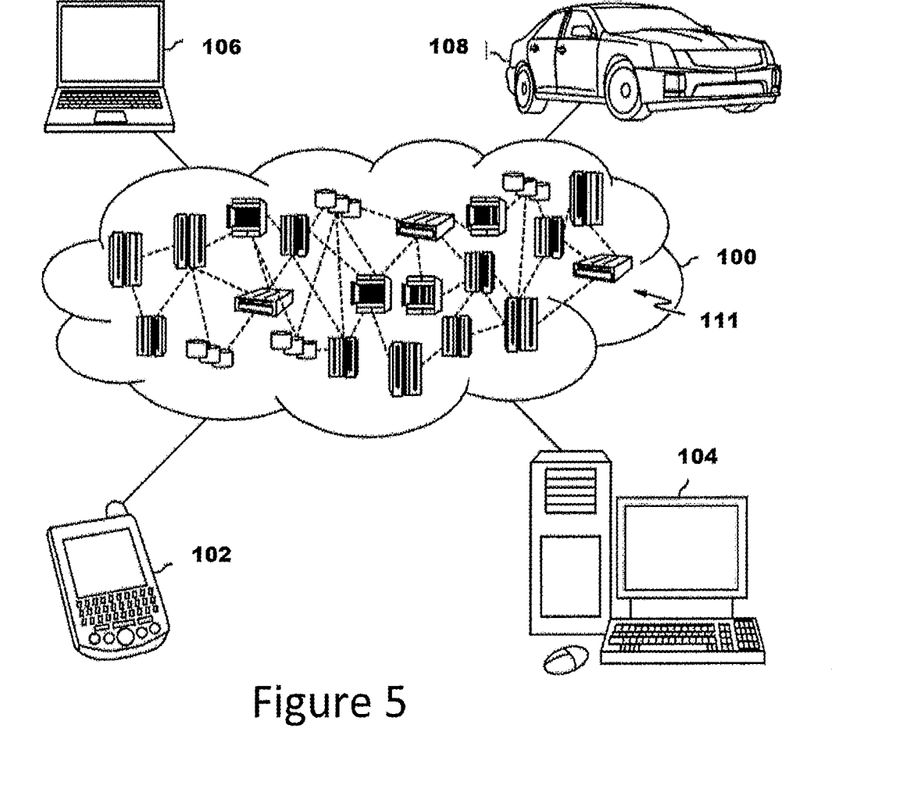
FIG. 5 depicts a cloud computing environment according to embodiments of the present invention.

A cloud computing environment is service oriented with a focus on statelessness, low coupling, modularity, and semantic interoperability. At the heart of cloud computing is an infrastructure comprising a network of interconnected nodes. Referring now to FIG. 5, illustrative cloud computing environment 100 is depicted. As shown, cloud computing environment 100 comprises one or more cloud computing nodes 111 with which local computing devices used by cloud consumers, such as, for example, personal digital assistant (PDA) or cellular telephone 102, desktop computer 104, laptop computer 106, and/or automobile computer system 108 may communicate. Nodes 111 may communicate with one another. They may be grouped (not shown) physically or virtually, in one or more networks, such as Private, Community, Public, or Hybrid clouds as described hereinabove, or a combination thereof. This allows cloud computing environment 100 to offer infrastructure, platforms and/or software as services for which a cloud consumer does not need to maintain resources on a local computing device. It is understood that the types of computing devices shown in FIG. 5 are intended to be illustrative only and that computing nodes 111 and cloud computing environment 100 can communicate with any type of computerized device over any type of network and/or network addressable connection (e.g., using a web browser).

Figure 6:
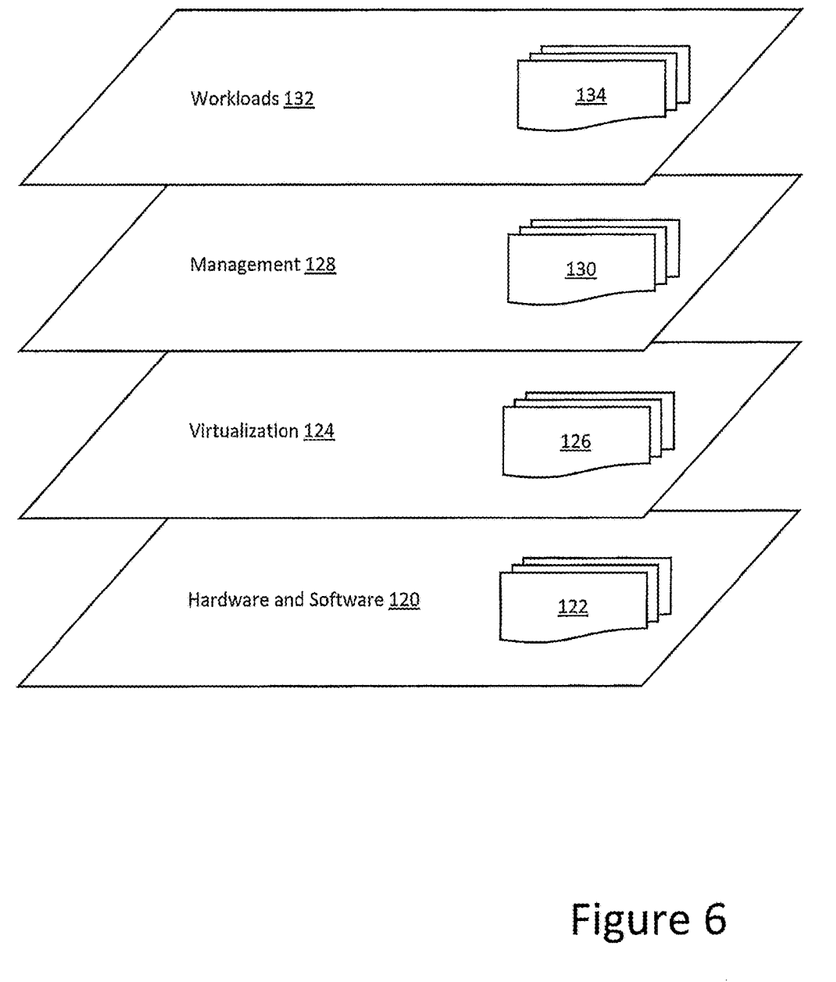
FIG. 6 depicts abstraction model layers according to embodiments of the present invention.

Referring now to FIG. 6, a set of functional abstraction layers provided by cloud computing environment 100 (FIG. 5) is shown. It should be understood in advance that the components, layers, and functions shown in FIG. 6 are intended to be illustrative only and embodiments of the invention are not limited thereto. As depicted, the following layers and corresponding functions are provided: Hardware and software layer 120 includes hardware and software components 122. Examples of hardware components include: mainframes; RISC (Reduced Instruction Set Computer) architecture based servers; servers; blade servers; storage devices; and networks and networking components. In some embodiments, software components include network application server software and database software.

Virtualization layer 124 provides an abstraction layer from which the following examples of virtual entities 126 may be provided: virtual servers; virtual storage; virtual networks, including virtual private networks; virtual applications and operating systems; and virtual clients. In one example, management layer 128 may provide various functions 130 as e.g., described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators.

Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. Workloads layer 132 provides various functionality 134 for which the cloud computing environment may be utilized. Examples of workloads and functions which may be provided from this layer include: mapping and navigation; software development and lifecycle management; virtual classroom education delivery; data analytics processing; transaction processing; and e.g., case DRaaS.

It is understood that cellular cloud BSS 18 may be implemented as a computer program product stored on a computer readable storage medium. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Python, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Computing system 10 that may comprise any type of computing device and for example includes at least one processor 12, a memory 20, an input/output (I/O) 14 (e.g., one or more I/O interfaces and/or devices), and a communications pathway 16. In general, processor(s) 12 execute program code which is at least partially fixed in memory 20. While executing program code, processor(s) 12 can process data, which can result in reading and/or writing transformed data from/to memory and/or I/O 14 for further processing. The pathway 16 provides a communications link between each of the components in computing system 10. I/O 14 can comprise one or more human I/O devices, which enable a user to interact with computing system 10. Computing system 10 may also be implemented in a distributed manner such that different components reside in different physical locations.

Furthermore, it is understood that the cellular cloud BSS 18 or relevant components thereof (such as an API component, agents, etc.) may also be automatically or semi-automatically deployed into a computer system by sending the components to a central server or a group of central servers. The components are then downloaded into a target computer that will execute the components. The components are then either detached to a directory or loaded into a directory that executes a program that detaches the components into a directory. Another alternative is to send the components directly to a directory on a client computer hard drive. When there are proxy servers, the process will select the proxy server code, determine on which computers to place the proxy servers' code, transmit the proxy server code, then install the proxy server code on the proxy computer. The components will be transmitted to the proxy server and then it will be stored on the proxy server.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A cellular resource sharing support system, comprising:
 a behavior analysis system that collects usage data from a set of mobile devices in a cellular network;
 a subscription manager that computationally generates offers to mobile device owners to avail excess compute resources of the mobile devices to a resource sharing services system;
 a device manager that tracks the real-time availability and usage of participating mobile devices that are associated with the mobile device owners that have accepted the offers to avail the excess compute resources; and
 an account manager that calculates and provides a compensation to the mobile device owners that have accepted the offers to avail the excess compute resources of the participating mobile devices to the resource sharing services system.

2. The cellular resource sharing support system of claim 1, further comprising a services manager that provisions a catalogue of virtual machine units for consumption by resource consumers and manages associates service level agreements.

3. The cellular resource sharing support system of claim 1, wherein each offer generated for a mobile device owner is based on collected usage data of an associated mobile device.

4. The cellular resource sharing support system of claim 3, wherein the offer requires the mobile device owner to avail a predetermine percentage of the excess compute resources of the associated mobile device for a predetermined amount of time provided that an average utilization of the associated mobile device falls below a predetermined threshold for a predetermined period of time.

5. The cellular resource sharing support system of claim 3, wherein the offer requires the mobile device owner to avail excess compute resources of the associated mobile device provided a threshold amount of the excess compute resources is not exceeded.

6. The cellular resource sharing support system of claim 1, wherein the device manager identifies and schedules groups of participating mobile devices, wherein each group is capable of provisioning a virtual machine unit with a predetermined amount of redundancy.

7. The cellular resource sharing support system of claim 1, wherein the compensation is selected from a group consisting of: a billing credit, a token, or a service.

8. A computer program product stored on a computer readable storage medium, which when executed by a computing system, provides a cellular resource sharing support system, the program product comprising:
program code that collects usage data from a set of mobile devices in a cellular network;
program code that computationally generates offers to mobile device owners to avail excess compute resources of the mobile devices to a resource sharing services system;
program code that tracks the real-time availability and usage of participating mobile devices that are associated with the mobile device owners that have accepted the offers to avail the excess compute resources; and
program code that calculates and provides a compensation to the mobile device owners that have accepted the offers to avail the excess compute resources of the participating mobile devices to the resource sharing services system.

9. The computer program product of claim 8, further comprising program code that provisions a catalogue of virtual machine units for consumption by resource consumers and manages associates service level agreements.

10. The computer program product of claim 8, wherein each offer generated for a mobile device owner is based on collected usage data of an associated mobile device.

11. The computer program product of claim 10, wherein the offer requires the mobile device owner to avail a predetermine percentage of the excess compute resources of the associated mobile device for a predetermined amount of time provided that an average utilization of the associated mobile device falls below a predetermined threshold for a predetermined period of time.

12. The computer program product of claim 10, wherein the offer requires the mobile device owner to avail excess compute resources of the associated mobile device provided a threshold amount of the excess compute resources is not exceeded.

13. The computer program product of claim 8, further comprising program code that identifies and schedules groups of participating mobile devices, wherein each group is capable of provisioning a virtual machine unit with a predetermined amount of redundancy.

14. The computer program product of claim 8, wherein the compensation is selected from a group consisting of: a billing credit, a token, or a service.

15. A computerized method that provides a cellular resource sharing support system, the method comprising:
collecting usage data from a set of mobile devices in a cellular network;
computationally generating offers to mobile device owners to avail excess compute resources of the mobile devices to a resource sharing services system;
tracking the real-time availability and usage of participating mobile devices that are associated with the mobile device owners that have accepted the offers to avail the excess compute resources; and
calculating and providing a compensation to the mobile device owners that have accepted the offers to avail the excess compute resources of the participating mobile devices to the resource sharing services system.

16. The method of claim 15, further comprising provisioning a catalogue of virtual machine units for consumption by resource consumers and managing associates service level agreements.

17. The method of claim 15, wherein each offer generated for a mobile device owner is based on collected usage data of an associated mobile device.

18. The method of claim 17, wherein the offer requires the mobile device owner to avail a predetermine percentage of the excess compute resources of the associated mobile device for a predetermined amount of time provided that an average utilization of the associated mobile device falls below a predetermined threshold for a predetermined period of time.

19. The method of claim 17, wherein the offer requires the mobile device owner to avail excess compute resources of the associated mobile device provided a threshold amount of the excess compute resources is not exceeded.

20. The method of claim 15, further comprising identifying and scheduling groups of participating mobile devices, wherein each group is capable of provisioning a virtual machine unit with a predetermined amount of redundancy.

* * * * *